United States Patent
Lacalle Bayo

(10) Patent No.: US 9,097,439 B2
(45) Date of Patent: Aug. 4, 2015

(54) VEHICLE FOR CLEANING MIRRORS OF THERMOSOLAR PLANTS

(75) Inventor: Jesús Lacalle Bayo, Valencia (ES)

(73) Assignee: GD Energy Services, S.A.U., Valencia (ES)

( * ) Notice: Subject to any disclaimer, the term of this patent is extended or adjusted under 35 U.S.C. 154(b) by 0 days.

(21) Appl. No.: 14/360,351

(22) PCT Filed: Nov. 25, 2011

(86) PCT No.: PCT/ES2011/070820
§ 371 (c)(1),
(2), (4) Date: May 29, 2014

(87) PCT Pub. No.: WO2013/076323
PCT Pub. Date: May 30, 2013

(65) Prior Publication Data
US 2015/0082559 A1    Mar. 26, 2015

(51) Int. Cl.
*B08B 11/00*    (2006.01)
*F24J 2/46*    (2006.01)
*F24J 2/14*    (2006.01)

(52) U.S. Cl.
CPC ............. *F24J 2/461* (2013.01); *B08B 11/00* (2013.01); *F24J 2/14* (2013.01); *Y02E 10/45* (2013.01)

(58) Field of Classification Search
CPC .................. F24J 2/461; B08B 11/00
See application file for complete search history.

(56) References Cited

FOREIGN PATENT DOCUMENTS

| | | | |
|---|---|---|---|
| CH | 598 422 | * | 4/1978 |
| CN | 101694327 A | | 4/2010 |
| EP | 2153194 A1 | | 2/2010 |
| EP | 2295158 A1 | | 3/2011 |
| ES | 2013032 A6 | | 4/1990 |
| ES | 2267393 A1 | | 3/2007 |
| ES | 2350083 A1 | | 1/2011 |
| WO | 2010/142837 A1 | | 12/2010 |

* cited by examiner

*Primary Examiner* — Randall Chin
(74) *Attorney, Agent, or Firm* — Richard M. Goldberg

(57) ABSTRACT

This comprises at least one cleaning device set on at least one arm (2) fitted at one end with a brush which adapts to the surface of the mirror, and a set of devices for spraying water onto the surface or the mirror, in which the arm (2) also comprises an extendible portion (4) articulated to the truck body, and a retractable portion, said retractable portion consisting of a support structure (6) for the cleaning devices, said cleaning devices being a rotating brush (7) with the same shape as the mirror to be cleaned, water-spraying strips (14) close to the support structure (6) and a moving water-spraying strip (8), secured by means of a retractable arm (9), which can be folded from a retracted position close to the support structure (6) in the area swept by the rotating brush (7) to an operating position, outside the area swept by the rotating brush (7).

11 Claims, 5 Drawing Sheets

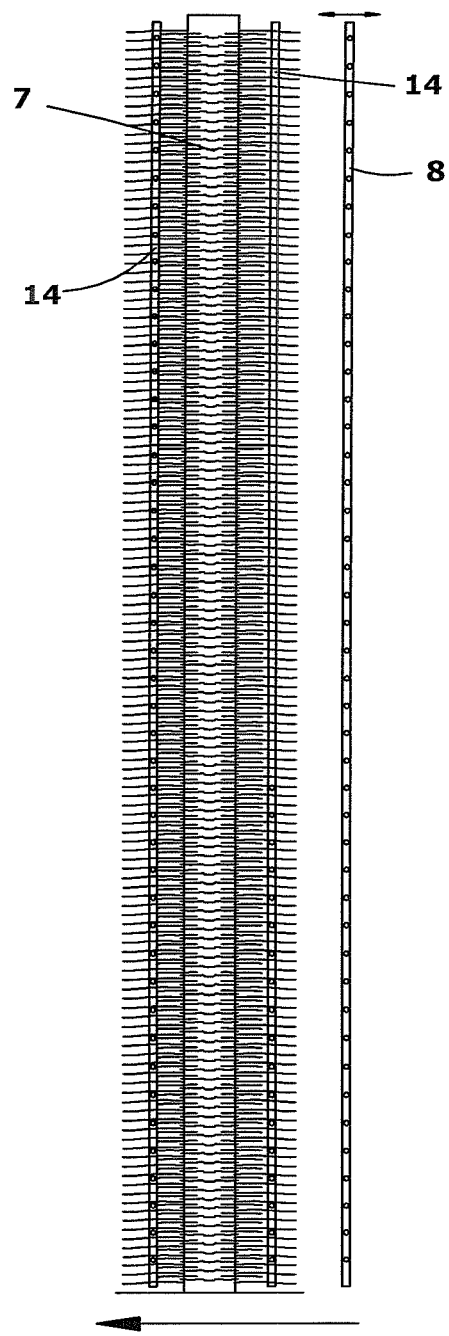 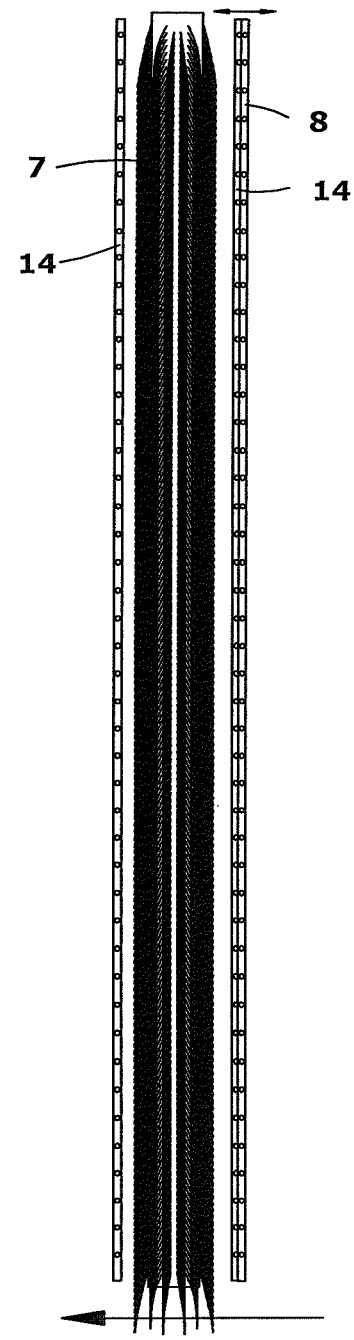
Fig. 4     Fig. 5

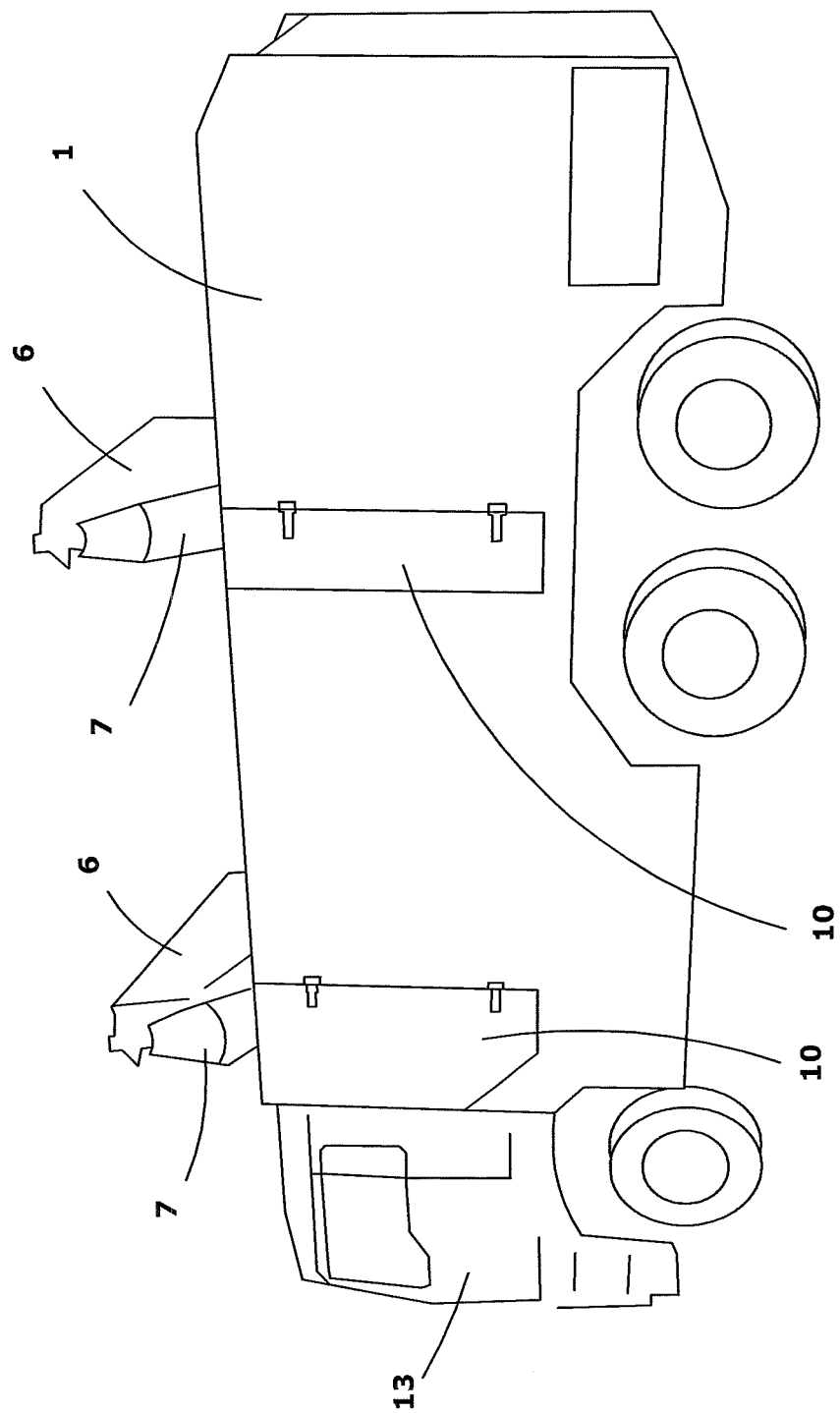

VEHICLE FOR CLEANING MIRRORS OF THERMOSOLAR PLANTS

This invention covers a vehicle which enables more effective cleaning of the parabolic section mirrors at thermo-solar installations, comprising at least one, and preferably a pair, of articulated arms on at least one of its sides, allowing the heads to be put away for storage in the body of the vehicle. The cleaning heads comprise a single or compound brush which adapts to the surface of the mirror and comprises means for retracting the water spraying devices.

Cleaning the mirrors at thermo-solar plants is essential for the plant to run at proper performance level. The dust sticking to the surface significantly reduces the reflectiveness of the reflective surfaces. The dirt is gradually deposited on the surface of the mirrors and this is "secured" even further through the effect of dew at night.

Cleaning with water is insufficient when the dirt is stuck to the mirrors. It is therefore useful to brush the surface in order to pull off and completely remove this dirt, thus getting a reflection index close to 100%.

STATE OF THE ART

Different cleaning devices have been developed for cleaning mirrors of thermo-solar installations.

ES 2 267 393 describes a device for washing a collector with a parabolic channel which comprises a vehicle sliding longitudinally in parallel to the channel, which is provided with a pair of bodies for spraying pressurised water onto the surface of the collector.

EP 2 153 914 describes a Method for cleaning mirrors with parabolic section of a thermo-solar plant and a device for executing the method in which the vehicle is fitted with articulated supports for securing the cleaning brushes. These brushes are brushes with a curved core which adapt to the surface of the solar collector.

WO 2010/142837 A1 discloses a vehicle and procedure for cleaning solar collectors with cylindrical-parabolic technology, fitted with articulated arms at front and rear positions of the vehicle. Although it uses articulated arms, these are accessible from the sides when retracted, which causes a great loss in aerodynamics when the vehicle moves. The mechanical system for movement of the rear arm may also be damaged when there is any accidental impact.

Through being rotating brushes, when these are operating their diameter increases due to centrifugal force. The invention described represents a brush whose centre has the longest bristles, which at a certain rotation speed generates a much greater tangential speed in the centre, through its diameter being greater than at the ends, where the diameter is lower. This has a direct influence and unwanted effects as regards wear of the brush (the greater the speed the greater the wear) both of the brush and of the surface to be cleaned.

It is helpful for water to be sprayed before and after the brushes go over the surface, the first time to make it easier to get the dirt off and the second to sweep away the dirt after brushing.

BRIEF DESCRIPTION OF THE INVENTION

This invention consists of a vehicle for cleaning mirrors of thermo-solar plants which comprises at least one and preferably two arms holding the cleaning devices and housings in the truck body with access from the sides for each of these arms.

Each arm is articulated to the base of the truck body and is telescopically extendible. To rotate the arm there is a drive system which normally consists of a pneumatic piston or a hydraulic cylinder.

The end of the arm supports an essentially triangular structure, holding at least one rotating brush with a rigid static core, articulated to said arm at one of its vertices. The rotation of the structure holding the brush can be driven normally through the action of a pneumatic piston or hydraulic cylinder.

The structure bearing the rotating brush also supports at least one curved water-spraying strip. According to one option there is more than one strip, at least one front strip and at least one rear strip, and preferably one front strip and two rear ones.

One of the water-spraying strips has to be close enough to the mirror to play its role effectively. The brush that is operating nevertheless extends its bristles to the greatest diameter, for which reason the position of the water-spraying strip must be outside the area swept by the brush. This means a great disadvantage when retracting the cleaning arm to the rest and transport position, as the volume required in the truck is greater than would be desirable, and thus reduces the capacity of the water tank, for example.

For this reason a retracting support for the water-spraying strip has been designed, in such a way that when the brush is operating, this water-spraying strip is outside the area swept by the brush, but when the brush has to be retracted, the support draws closer to the idle brush. The operation is normally powered by means of a pneumatic piston or a hydraulic cylinder.

BRIEF DESCRIPTION OF THE DRAWINGS

In order to illustrate the following explanation better, five pages of drawings are adjoined to this descriptive report, representing the essence of this invention in six figures, and in which:

FIG. 4 shows a schematic view of an operating brush from a front viewpoint, with water-spraying strips (located behind the brush), and a retractable water-spraying strip that has moved outwards so as not to interfere with the brush's sweeping action;

FIG. 5 shows a schematic view like that of FIG. 4, but in which the brush is idle and the retractable water-spraying strip has retracted towards the brush and FIG. 6 shows a general schematic view in perspective of the vehicle for cleaning mirrors of thermo-solar plants of the invention with two retracted arms.

DESCRIPTION OF THE PREFERRED EMBODIMENTS

Figure 1:
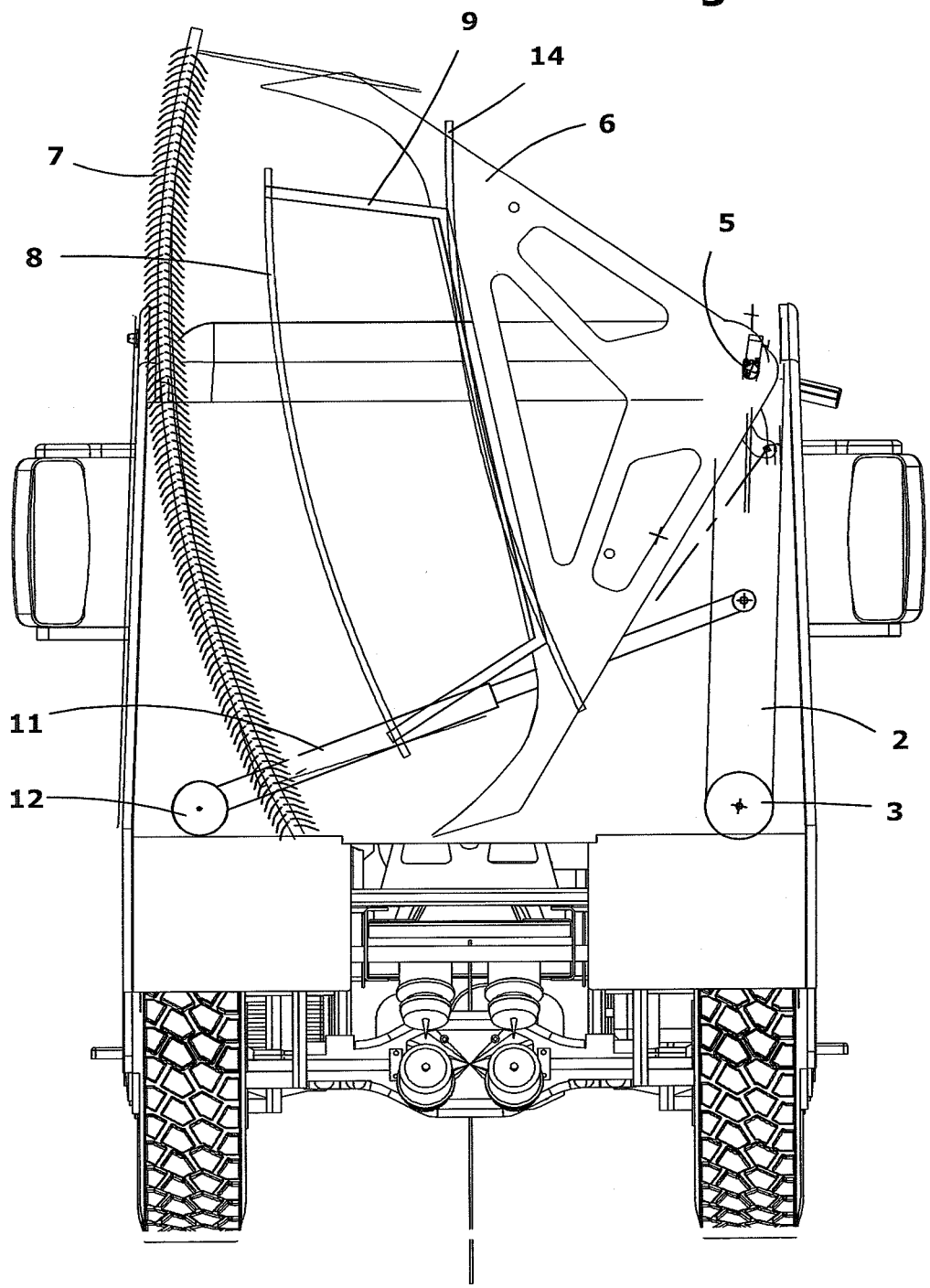
FIG. 1 shows a schematic view from the rear of a truck according to the invention in which there are extendible articulated arms for supporting rotating brushes, whose profile adapts to that of the mirror to be cleaned.
Figure 2:
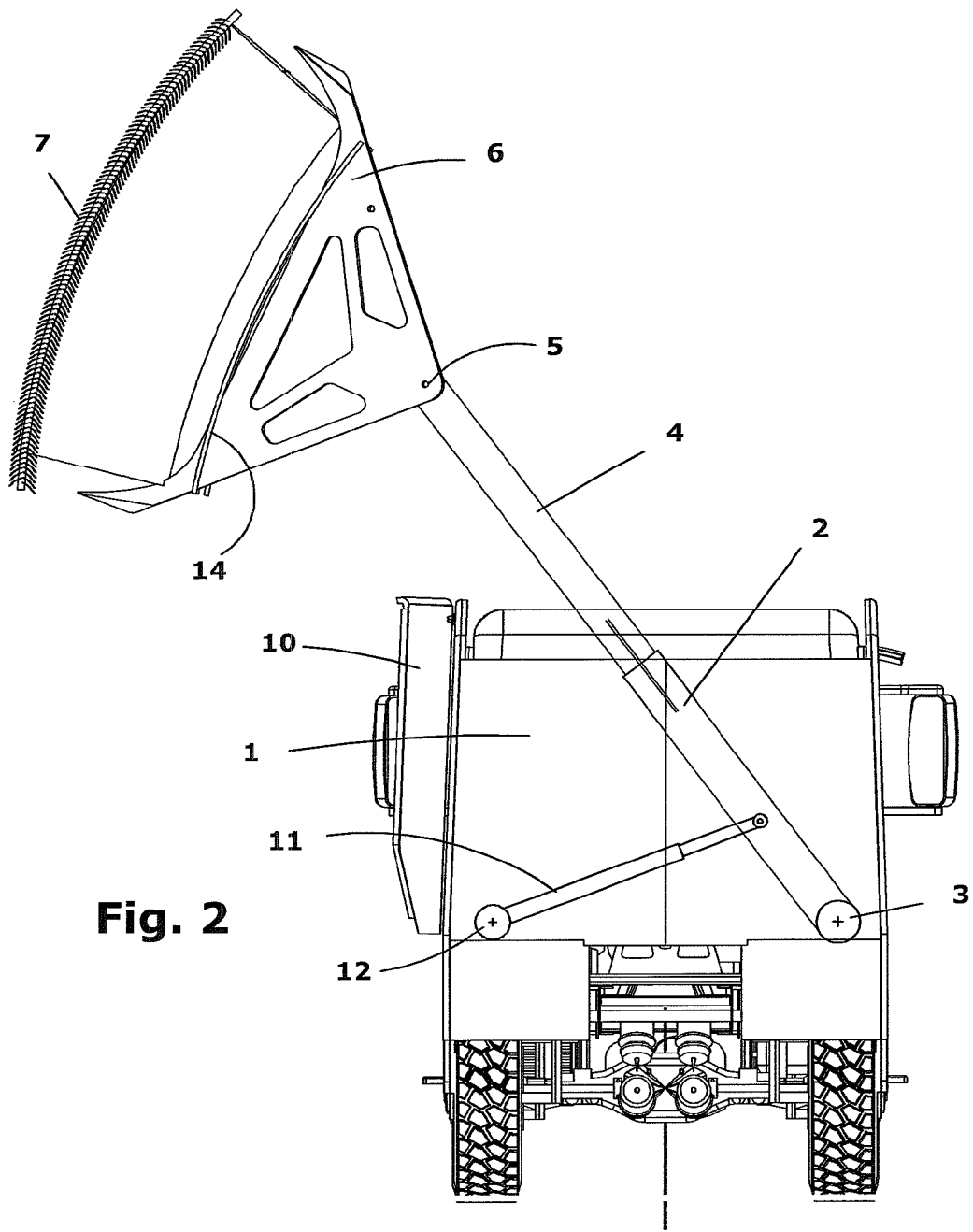
FIG. 2 shows a schematic view similar to that of FIG. 1, but with one of the arms extended to a position for cleaning the top part of the mirror.
Figure 3:
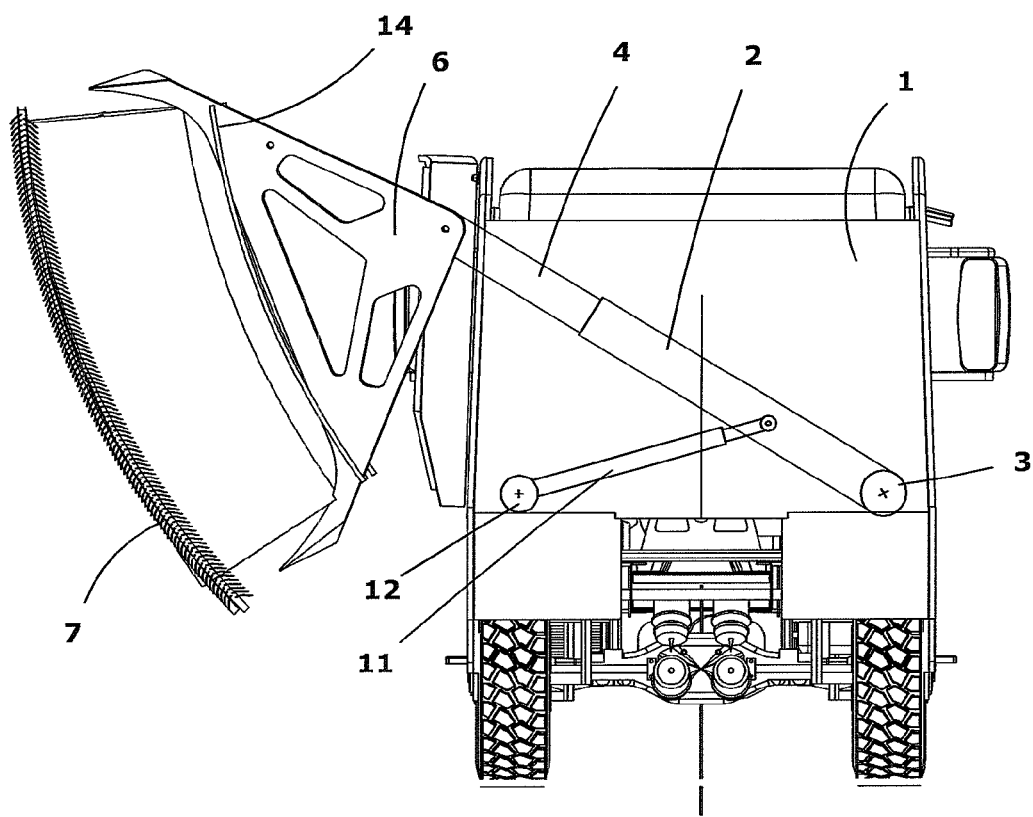
FIG. 3 shows a schematic view, similar to that of FIGS. 1 and 2, but in which one of the arms is extended to a position for cleaning the bottom part of the mirror.

A vehicle for cleaning mirrors of thermo-solar plants is described, specifically a truck (1) provided with a driving cab (13) and a rear body. The rear body comprises at least one and preferably two lateral recesses, in which two extendible arms (2) are located, provided with a structure (6) for supporting the cleaning items. Each of these recesses has a door (10) which allows the arm (2) not to be accessible from the outside, thus providing better safety conditions and cleanliness.

The arms (2) are provided with an articulation mechanism (3) in respect of the securing base on the truck body (1). It will normally be enough for the articulation to act in respect of an axis in parallel to the longitudinal axis of the truck (1). The arms also comprise an extendible portion (4) which allows the head movement zone to be greater at the same time as enabling this to fold away very compactly in its housing in the truck body.

The arm rotation drive is powered by means of a pneumatic piston or hydraulic cylinder (11) also fitted in the body of the truck (1), and which has an articulation mechanism (12), enabling it to rotate freely, restricted by the extended length of said cylinder.

The structure (6) for supporting the cleaning devices comprises a rotation axis (5) in respect of the arm (2), and particularly in respect of the extendible portion (4) of this. This support structure essentially has a triangular shape and the rotation axis (5) is arranged close to one of the vertices of said triangle.

This support structure (6) comprises a support for a rotating brush (7). The rotating brush can be made in one or several independent portions. The rotating brush (7) adapts to fit the shape of the mirror that has to be cleaned. This will normally be made up of a fixed rigid core, with the shape of the profile of the mirror to be cleaned, and one or more rotating casings, driven by means of at least one motor, normally fitted on at least one of their ends.

The support structure (6) also comprises at least one water-spraying strip (14); preferably one is set in front of the mirror and another behind this (in the direction of the cleaning trajectory). These curved water-spraying strips (14) are located beside said support structure (6), and outside the range swept by the brush (7).

The support structure (6) also comprises a mobile water-spraying strip (8). This strip lies close to the surface to be cleaned, as it has to ensure that the dirt detached by the brush (7) is properly rinsed off.

There are two problems in this respect:

If the position is too close to the brush (7), its sweep area will interfere with the position of the mobile water-spraying strip (8);

If the position is far enough away from the brush (7) for it not to be in the sweep area, this will require the retraction recess in the truck body to be larger, reducing the cleaning water storage capacity, for example, and thus reducing the truck's performance in use through requiring refilling more often than would be desirable.

For this reason a retractable arm (9) has been designed, by means of which said mobile water-spraying strip (8) can draw closer or move away, through the action of a pneumatic piston or hydraulic cylinder. This means that when it is operating, with the brush running, it is further away, and when the arm is retracted to be put away in the truck body (1) this lies close to the brush (7), which would interfere with the area swept by this if this brush (7) were running.

The invention claimed is:

1. A vehicle for cleaning the mirrors of thermo-solar plants, comprising:
    at least one arm;
    at least one cleaning device set on the least one arm and fitted at one end with at least one brush adapted to a surface of a mirror to be cleaned; and
    a set of devices for spraying water onto the surface for soaking the surface at least one of before brushing and before rinsing off dirt adapted to be detached by the at least one brush;
    the at least one arm including:
        an extendible portion adapted to be articulated to a truck of a type having a driving cab and a rear body, in which the rear body has at least one lateral recess in which the at least one arm is adapted to be located,
        a retractable portion including a structure for supporting the at least one cleaning device, and
        an articulation mechanism for securing the at least one arm on the rear body of the truck along an axis parallel to a longitudinal axis of the truck;
    a piston-cylinder arrangement connected to each arm for lifting each arm and having a freely rotating articulation mechanism adapted to be connected to the rear body of the truck; and
    a support structure connected to each arm, and which supports at least one said cleaning device, and
    wherein each said recess is fitted with a door which conceals each arm therein and the corresponding support structure therefor.

2. A vehicle for cleaning the mirrors of thermo-solar plants, according to claim 1, wherein each said support structure for the at least one cleaning device comprises a rotation axis for rotatably supporting the support structure on a respective said arm.

3. A vehicle for cleaning the mirrors of thermo-solar plants, according to claim 2, wherein each said support structure for the at least one cleaning device comprises a rotation axis for rotatably supporting the support structure on the extendible portion of a respective said arm.

4. A vehicle for cleaning the mirrors of thermo-solar plants, according to claim 2, wherein each said support structure has an essentially triangular shape and the rotation axis thereof is set close to one vertex of this triangular shape.

5. A vehicle for cleaning the mirrors of thermo-solar plants, according to claim 1, wherein each said support structure comprises a support for a rotating brush which adopts the shape of the mirror to be cleaned.

6. A vehicle for cleaning the mirrors of thermo-solar plants, according to claim 5, wherein the rotating brush is made of at least one portion.

7. A vehicle for cleaning the mirrors of thermo-solar plants, according to claim 5, wherein the rotating brush is formed of a fixed rigid core, with the shape of a profile of a mirror to be cleaned and at least one rotating casing, driven by at least one motor.

8. A vehicle for cleaning the mirrors of thermo-solar plants, according to claim 5, wherein each said support structure comprises at least one water-spraying strip, each water-spraying strip being located beside the support structure and outside a range of a sweep of the rotating brush.

9. A vehicle for cleaning the mirrors of thermo-solar plants, according to claim 8, wherein each said support structure comprises two water-spraying strips, a first water-spraying strip in front of the mirror and a second water-spraying strip behind the first water-spraying strip in a direction of a cleaning path, these two water-spraying strips being located beside the support structure and outside the range of the sweep of the rotating brush.

10. A vehicle for cleaning the mirrors of thermo-solar plants, according to claim 5, wherein each said support structure comprises a mobile water-spraying strip held by a retractable arm which is driven by a piston-cylinder arrangement between a retracted position close to the support structure and inside a sweep area of the rotating brush, and an operating position further away from the support structure and outside the sweep area of the rotating brush.

11. A vehicle for cleaning the mirrors of thermo-solar plants, comprising:
   at least one arm;
   at least one cleaning device set on the least one arm and fitted at one end with at least one brush adapted to a surface of a mirror to be cleaned; and
   a set of devices for spraying water onto the surface for soaking the surface at least one of before brushing and before rinsing off dirt adapted to be detached by the at least one brush;
   the at least one arm including:
      an extendible portion adapted to be articulated to a truck of a type having a driving cab and a rear body, in which the rear body has at least one lateral recess in which the at least one arm is adapted to be located,
      a retractable portion including a structure for supporting the at least one cleaning device, and
      an articulation mechanism for securing the at least one arm on the rear body of the truck along an axis parallel to a longitudinal axis of the truck;
   a piston-cylinder arrangement connected to each arm for lifting each arm and having a freely rotating articulation mechanism adapted to be connected to the rear body of the truck; and
   wherein the rear body has two said lateral recesses in which one arm of the at least one arm is adapted to be located in each of said lateral recesses.

* * * * *